United States Patent [19]

Eavenson, Sr. et al.

[11] Patent Number: 5,593,367

[45] Date of Patent: Jan. 14, 1997

[54] SWITCHABLE IGNITION AND STARTER CONTROL SYSTEM

[75] Inventors: Jimmy N. Eavenson, Sr., Juneau; Barry M. Hough, Beaver Dam, both of Wis.

[73] Assignee: Deere & Company, Moline, Ill.

[21] Appl. No.: 516,887

[22] Filed: Aug. 18, 1995

[51] Int. Cl.⁶ .................................................. B60K 41/20
[52] U.S. Cl. ........................................ 477/203; 123/179.4
[58] Field of Search .......................... 477/203; 123/179.4

[56] References Cited

U.S. PATENT DOCUMENTS

| | | | |
|---|---|---|---|
| 3,830,328 | 8/1974 | Schaefer et al. | 477/203 |
| 4,974,711 | 12/1990 | Peterson, Jr. et al. | 477/203 |
| 5,377,641 | 1/1995 | Salazar | 123/179.4 |

OTHER PUBLICATIONS

Club Car, Inc., brochure entitled "ClubCar", 16 pages (see particularly p. 5), dated 1986, published in the U.S.A.

*Primary Examiner*—Dirk Wright

[57] ABSTRACT

In a utility vehicle operable in either a runabout or continuous mode, a foot operated accelerator pedal switch activates a main relay to start the engine and to maintain the engine running as long as the pedal is depressed with a key switch in the run position. When the pedal is released with the vehicle operating in the runabout mode, the main relay is deactivated and the engine is killed. Depressing the pedal activates the main relay to start the engine and maintain the engine running. The key switch is connected to latching relay structure and has a neutral run latch position. The latching relay structure is operably connected to the key switch and to a parking brake switch. The neutral run switch position and the latching structure permit continuous running of the engine as long as the parking brake is engaged. To switch from the runabout mode to the continuous run mode, the operator moves the key switch to the special latch position and engages the parking brake to provide an alternate activation path to the main relay. Releasing the parking brake or turning the key switch to the off position will shut off the engine.

20 Claims, 1 Drawing Sheet

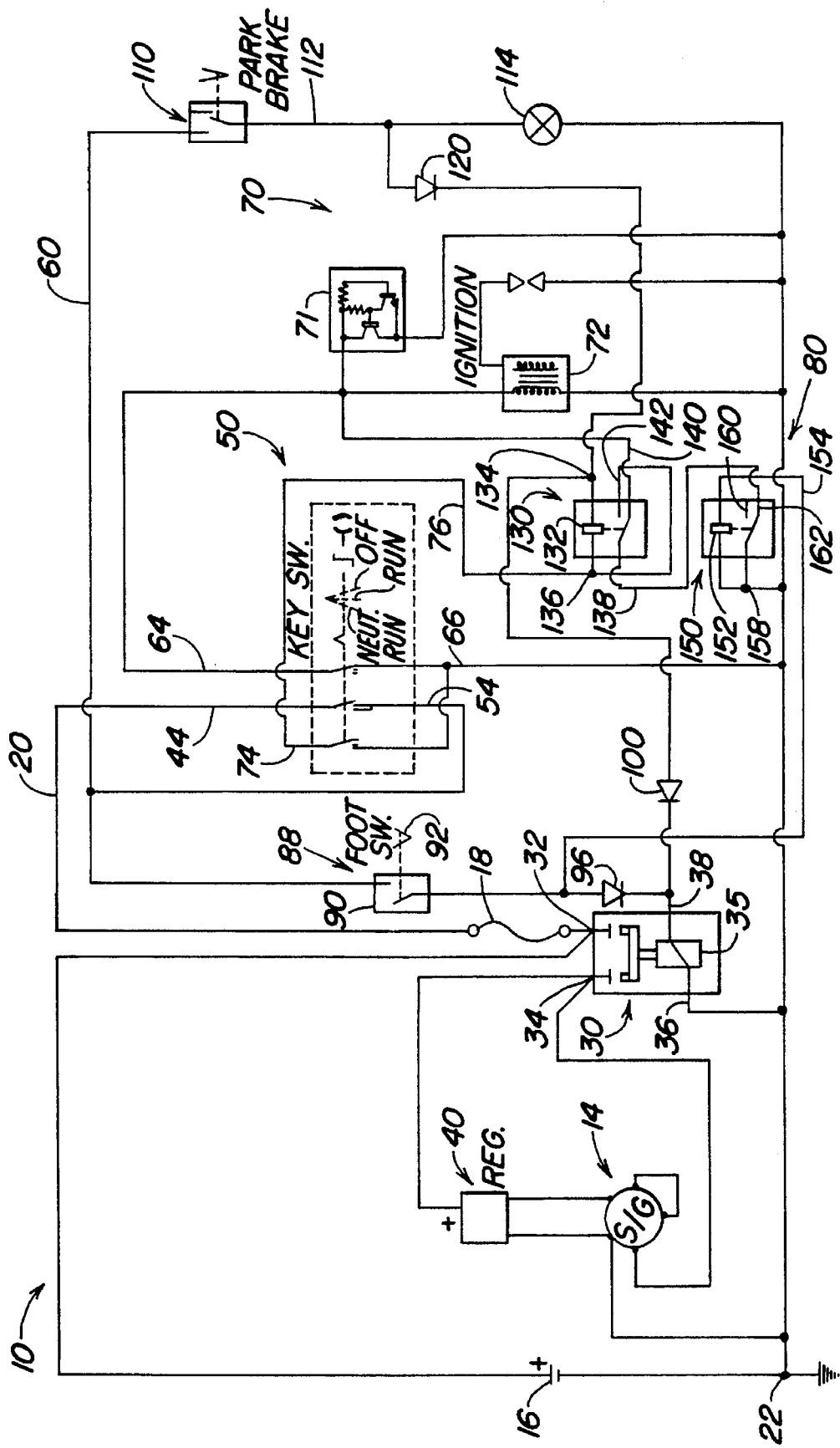

SWITCHABLE IGNITION AND STARTER CONTROL SYSTEM

BACKGROUND OF THE INVENTION

1) Field of the Invention

The present invention relates generally to utility vehicles, and more specifically, to a switchable circuit for operating such a utility vehicle in either a start/stop foot pedal mode or a continuous key-switch mode.

2) Related Art

Light utility vehicles used where frequent starts-stops with short run times are common typically have a control system for providing a foot pedal mode of start-stop operation which allows an operator to activate a starter while the vehicle is in gear. To start the vehicle and begin moving forwardly, the operator simply pushes on the foot pedal. When the foot pedal is released, the engine and vehicle will stop. The start-stop type of circuit allows the vehicle to be used as a runabout in areas such as on golf courses and security patrols and in factories. However, the start-stop type of circuit is not satisfactory if constant operation in a work mode is required, and a separate control system is required to provide an ignition switch or constant mode of operation in addition to the foot pedal mode. The separate system is required, for example, if the vehicle is powering lights or other types of accessories and the engine must run to maintain a battery charge. The need for two separate ignition and starter control systems to facilitate both the foot pedal mode and the key switch or continuous mode of operation adds cost and complexity to the vehicle.

BRIEF SUMMARY OF THE INVENTION

It is therefore an object of the present invention to provide an improved control system for a utility vehicle or the like. It is a further object to provide such an improved control system which overcomes most or all of the aforementioned problems.

It is a further object of the present invention to provide an improved control system for a utility vehicle wherein both a foot pedal and a conventional key switch or continuous mode of operation are facilitated. It is a further object to provide such an improved control system which obviates two separate ignition and starter systems. It is still another object to provide such a control system wherein the mode of operation can be changed quickly and easily.

It is still another object of the present invention to provide an improved ignition and starter control system that permits a light utility vehicle or similar vehicle to be operated as either a run-about vehicle or a work vehicle. It is another object to provide such a system which is relatively simple and inexpensive and which permits the operator to quickly switch from foot pedal operation to a continuous run operation by movement of a switch. It is yet another object to provide such a system which requires a minimal number of additional components and is easy to understand and operate.

A switchable ignition and starter control system constructed in accordance with the teachings of the present invention includes a main relay connected between the source of electrical power and a starter/generator. An accelerator or foot pedal operated switch activates the main relay to start the engine and to maintain the engine running as long as the pedal is depressed with the key switch in the run position. When the pedal is released with the vehicle operating in the foot pedal or runabout mode, the main relay deactivates and the engine is killed. Depressing the pedal once again causes the main relay to activate to start the engine and maintain the engine running.

The key switch is connected to latching relay structure and has a special neutral run latch position. The latching relay structure is operably connected to the key switch and to a parking brake switch. The special switch position and the latching structure provide continuous running of the engine if the parking brake is engaged. To switch from foot pedal to continuous run operation, the operator moves the key switch to the special latch position and engages the parking brake to provide an alternate activation path to the main relay and prevent grounding of the ignition circuit by an interlock or latching circuit when the accelerator is released. Releasing the parking brake or turning the key switch to the off position will ground the ignition circuit and shut off the engine. The latch position can also be utilized to start the engine when the park brake is engaged, and therefore the key switch can operate in a conventional manner with off, run, and start positions.

The system is relatively simple and inexpensive and obviates the need for two separate ignition and starter control systems to facilitate both the foot pedal and the continuous or key switch modes of operation. The vehicle converts easily between the runabout and the continuous run modes of operation. The system advantageously utilizes an existing park brake switch and a key switch position corresponding to the normal start position to reduce system complexity and make conversion between operational modes very simple for an operator.

These and other objects, features and advantages of the present invention will become apparent to one skilled in the art upon reading the following detailed description in view of the drawings.

BRIEF DESCRIPTION OF THE DRAWINGS

The single drawing figure is a schematic representation of a switchable ignition and starter control circuit.

DETAILED DESCRIPTION OF THE DRAWINGS

Referring now to the drawing, therein is shown an ignition and starter circuit 10 for a utility vehicle having a combination starter/generator 14 operably connected to a conventional vehicle engine (not shown). A power source such as a battery 16 has a positive terminal connected through a fusible link 18 to a positive fused line 20. The battery 16 also has a negative terminal connected to a system ground 22.

A main relay 30 has switched terminals 32 and 34 connected to the positive battery terminal and to the starter/generator 14, respectively. The main relay also has a continuous duty activation coil 35 having a first lead 36 connected to ground and a control lead 38 which, when powered, activates the relay 30 so the terminals 32 and 34 are connected to close the circuit between the battery 16 and the starter/generator 14. A voltage regulator 40 is connected between the starter/generator 14 and the terminal 34 to provide regulated charging to the battery 16 after the engine starts.

The positive fused line 20 is connected to one input terminal 44 of a three-terminal, three position ganged key switch 50 having off, run and neutral run latch positions. In the run and run latch positions, the terminal 44 is connected via line 54 to a switched voltage line 60 so that battery voltage will be applied to the line 60.

The key switch 50 also includes an input terminal 64 which, when the switch is in a first or off position, is grounded via line 66. The terminal 64 is connected to an engine ignition circuitry, indicated generally at 70 and having an ignition module 71 and a magneto ignition 72. With the key switch 50 in the off position, the ignition circuit 70 is grounded to kill the engine.

The key switch 50 further includes a third input terminal 74 connected by a line 76 to interlock or latching relay structure indicated generally at 80. The third terminal 74 is normally open, except when the key switch is moved to the third or neutral run latch position (to the left, as shown in the drawing), wherein the line 76 is grounded. The switch 50 is spring loaded to return to the second or run position when released from the third position.

The control lead 38 of the main relay 30 is connected to a foot switch circuit indicated generally at 88 which includes a switch 90 connected to an accelerator pedal 92. With the pedal 92 released, the switch 90 is open. To start the engine, the operator places the key switch 50 in the run position and depresses the pedal 92 so the switch 90 closes and provides a closed path from the switched voltage line 60 to the control lead 38 via blocking diode 96 to activate the main relay 30 for engine starting. Thereafter, the engine continues to run only as long as the accelerator pedal 92 is depressed and the switch 90 is closed, unless the latching structure 80 is activated and power is supplied through an alternate path to the control terminal 38 as described below. If the pedal 92 is released, the switch 90 opens to deactivate the main relay 30 unless the control terminal is powered through the latching structure 80.

To provide a continuous run mode of operation in addition to the foot pedal or runabout mode of operation described directly above, the control terminal 38 of the main relay 30 is also connected to the latching structure 80 and through a second blocking diode 100 to a park brake switch 110 to selectively provide an alternate source of control current to the relay coil 35 when the switch 90 is open. The park brake switch 110 is connected to the switched voltage line 60 and to a line 112. The switch 110 is in the off condition when the brake is released and in the on or closed condition when the brake is activated. The line 112 is therefore powered when the key switch 50 is in either the run or neutral latch position and the brake switch 110 is closed. An indicator lamp 114 is connected between the line 112 and ground to provide a visual indication when the brake is activated. The line 112 is also connected via diode 120 to the latching relay structure 80 and to the diode 100 to provide the alternate source of control current to the control terminal 38 of the relay 30 under a preselected set of conditions so that a continuous mode of operation is facilitated.

The latching relay structure 80 includes a first relay 130 having a coil 132 with a first lead 134 connected to the diode 120 and an opposite lead 136 connected to the switch terminal 74 through the line 76 so that the relay 130 will be activated when the line 112 is powered and the key switch is moved to the extreme left position (the neutral run latch position). A switched relay terminal 138 is connected to an output terminal 140 when the relay 130 is deactivated (down position) and to an output terminal 142 when the relay 130 is activated (up position). The terminal 142 is connected to the lead 136. The terminal 140 is connected to the ignition circuit 70.

The latching relay structure 80 also includes a second relay 150 generally identical to the relay 130. The relay 150 includes a coil 152 having a first lead 154 connected to the output of the foot switch 90 and an opposite lead connected to ground so the relay is activated when the switch 90 is closed with the line 60 powered. A switched relay terminal 158, which is grounded, is connected to an open output terminal 160 when the relay 150 is activated. The terminal 158 is connected to the terminal 138 of the relay 130 via relay terminal 162 when the relay 150 is deactivated. When both the relays 130 and 150 are deactivated (shown), the ignition circuit 70 will be grounded via terminals 140, 138, 162, and 158 and the engine will be killed. The relay 130 is activated via line 112, diode 120 and key switch terminal 74 when the key switch 50 is moved to the neutral run latch position and the park brake is engaged. Once activated, the relay 130 will be bootstrapped to the activated position when the relay 150 is deactivated (the foot switch 90 is off) to prevent grounding of the ignition circuit through the relays 130 and 150 so the engine can idle. Releasing the brake to remove power from the line 112 or turning the key switch to off to ground the ignition circuit through the terminal 64 and line 66 will also shut down the engine.

In operation in the runabout mode, the operator positions himself on the vehicle, switches the key switch 50 to the run position, and depresses the pedal 92 to activate the main relay 30 and start the engine. The engine may also be started by moving the key switch 50 to the third position with the park brake on so the relay 130 latches in the activated position and power is provided to the control terminal 38 of the relay 30. With the pedal 92 depressed, power is supplied through the switch 90 and the diode 96 to maintain the relay 30 activated. The relay 150 is also activated via lead 154 when the pedal 92 is depressed to prevent grounding of the ignition circuit 70 through the latching relay structure 80 when the park brake is released. Releasing the pedal 92 opens the switch 90 to deactivate the relay 30. The relays 130 and 150 will also deactivate and provide an engine killing ground connection from the ignition circuit 70 via terminals 140, 138, 162, and 158 as shown in the drawing figure.

If the operator wishes to switch to a continuous run mode, for example, to keep the engine idling to maintain a battery charge when electric accessories are being powered from the vehicle, he simply engages the park brake to close the switch 110 and provide power to the control terminal 38 of the relay 30 through the diodes 100 and 120 to maintain the relay 30 activated. He also moves the key switch 50 to the neutral run latch position (left) to ground the line 76 so the relay 130 is activated and bootstrapped on to prevent grounding of the ignition circuit 70 through the latching structure 80. When the operator releases the foot pedal 92 and the switch 90 opens, the relay 150 deactivates and also grounds the terminals 138 and 142 through the terminals 158 and 162. The engine will remain running without need to depress the foot pedal 92 until the park brake is disengaged or the key switch is switched to the off position.

Having described the preferred embodiment, it will become apparent that various modifications can be made without departing from the scope of the invention as defined in the accompanying claims. For example, although the condition responsive circuit is shown as park brake structure, other types of vehicle condition structure could likewise be utilized.

We claim:

1. In a utility vehicle having an engine with a starter circuit, an electrical power source, an ignition system with an ignition switch having a plurality of positions, an engagable accelerator control and an engagable park brake structure, control circuitry for selectively operating the vehicle in one of two modes, including a runabout mode wherein the engine starts when the accelerator control is engaged and stops when the control is released and a continuous operation mode wherein the engine is generally maintained in a continuous running condition, the control circuitry including:

interlock structure connected to the ignition system and responsive to engagement of the park brake structure, the interlock structure operable in the runabout mode to kill the engine when the accelerator control is released; and switch structure connected to the interlock structure for switching from the runabout mode to the continuous operation mode and preventing killing of the engine when the park brake is engaged.

2. The invention as set forth in claim 1 wherein the switch structure comprises a portion of the ignition switch.

3. The invention as set forth in claim 2 wherein the ignition switch has a run position and a continuous operation mode selection position.

4. The invention as set forth in claim 3 wherein the continuous operation mode selection position of the ignition switch is also a start position operable when the park brake structure is engaged to start the engine.

5. The invention as set forth in claim 1 wherein the interlock structure includes a latching relay structure connected to the ignition circuit, the latching relay structure having an engine killing state when the park brake structure is released and the accelerator control is released.

6. The invention as set forth in claim 5 wherein the ignition switch has an off position and the latching relay structure is responsive to movement of the ignition switch to an off position to kill the engine.

7. The invention as set forth in claim 1 including a main relay connected to the accelerator control and to the interlock structure and activatable in response to engagement of the accelerator control as well as to switching to the continuous operation mode.

8. The invention as set forth in claim 1 wherein the interlock structure includes a latching circuit connected to the park brake structure, the latching circuit having at least two states including a continuous run latched state, wherein the latching circuit is switchable to the latched state when the park brake structure is engaged and the switch structure is momentarily moved to a continuous operation mode position.

9. The invention as set forth in claim 8 wherein the switch structure includes a switch portion connected to the ignition switch and having run and start positions, the latching circuit responsive to movement of the ignition switch to the start position to switch to the latched state.

10. The invention as set forth in claim 9 wherein the latching circuit is responsive to disengagement of the park brake structure to switch to an unlatched state.

11. In a utility vehicle having an engine with a starter circuit, an electrical power source, an ignition system with an ignition switch having a plurality of positions, an engagable accelerator control and an engagable park brake structure, control circuitry for selectively operating the vehicle in one of two modes, including a runabout mode wherein the engine starts when the accelerator control is engaged and stops when the control is released and a continuous operation mode wherein the engine is generally maintained in a continuous running condition, the control circuitry including:

a main activatable switch structure connected between the power source and the ignition switch and having a control terminal;

an accelerator switch connected to the control terminal and responsive to accelerator control engagement to activate the main switch;

a vehicle condition responsive switch connected to the control terminal to activate the main switch in response to preselected vehicle conditions; and interlock structure connected to the ignition system and to the condition responsive switch and responsive to movement of the ignition switch to a continuous run position for maintaining the engine running when the accelerator control is released and the preselected vehicle conditions are present.

12. The invention as set forth in claim 11 wherein the ignition switch has a run position and is biased from the continuous run position to the run position.

13. The invention as set forth in claim 12 wherein the ignition, when in the continuous run position, also provides engine starting when the preselected vehicle conditions are present.

14. The invention as set forth in claim 11 wherein the interlock structure includes latching relay structure connected to the ignition circuit, the latching relay structure having an engine killing state when the preselected vehicle conditions are not present and the accelerator control is released.

15. The invention as set forth in claim 14 wherein the latching structure is responsive to movement of the ignition switch to the continuous run position to latch the relay structure in a non-killing state provided the preselected vehicle conditions are present.

16. In a utility vehicle having an engine with a starter circuit, an electrical power source, an ignition system, an engagable accelerator control and an engagable park brake structure, control circuitry for selectively operating the vehicle in one of two modes, including a runabout mode wherein the engine starts when the accelerator control is engaged and stops when the control is released and a continuous operation mode wherein the engine is generally maintained in a continuous running condition, switching circuitry for selecting the mode of operation including:

a switch connected to the ignition system and the power source and having a run position and a continuous run position;

an engine killing circuit connected to the ignition system and the switch, the engine killing circuit having a runabout mode condition and a continuous operation mode condition, the killing circuit in the runabout mode condition responsive to engagement of the accelerator control to prevent engine killing when the switch is in the run position and causing engine shutdown when the accelerator control is disengaged; and wherein the killing circuit is responsive to movement of the switch to the continuous run position to change to the continuous operation mode condition wherein the engine is maintained running when the accelerator control is released.

17. The invention as set forth in claim 16 wherein killing circuit is connected to the park brake structure and is responsive to engagement of the park brake structure to switch to the continuous operation mode condition.

18. The invention as set forth in claim 16 wherein the switch comprises an ignition switch, the switch in the continuous run position also providing engine starting when the park brake structure is engaged.

19. The invention as set forth in claim 16 including a main system relay connected to the power source and the starter circuit, and wherein the main system relay is activatable in response to engagement of the accelerator control to start the engine when the switch is in the run position.

20. The invention as set forth in claim 19 wherein the main relay is also activatable in response engagement of the park brake structure and wherein movement of the switch to the continuous run position provides an engine starting function so that the switch functions both as a starting switch and as a mode selection switch.

* * * * *